United States Patent
Park et al.

(10) Patent No.: US 9,054,799 B2
(45) Date of Patent: Jun. 9, 2015

(54) WIRELESS LIGHT COMMUNICATION SYSTEM AND WIRELESS LIGHT COMMUNICATION METHOD USING THE SAME

(75) Inventors: Seong-man Park, Seoul (KR); Young-jun Choi, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 82 days.

(21) Appl. No.: 13/614,155

(22) Filed: Sep. 13, 2012

(65) Prior Publication Data

US 2013/0136457 A1   May 30, 2013

(30) Foreign Application Priority Data

Nov. 30, 2011   (KR) .................. 10-2011-0127221

(51) Int. Cl.
 *H04B 10/11*   (2013.01)
 *H04J 14/06*   (2006.01)
 *H04B 10/116*   (2013.01)

(52) U.S. Cl.
 CPC .................................. *H04B 10/116* (2013.01)

(58) Field of Classification Search
 USPC .................................................. 398/118–131
 See application file for complete search history.

(56) References Cited

U.S. PATENT DOCUMENTS

| | | | | |
|---|---|---|---|---|
| 4,330,870 A | * | 5/1982 | Arends | 398/129 |
| 6,141,357 A | * | 10/2000 | Testani et al. | 370/507 |
| 6,961,521 B1 | * | 11/2005 | Foltzer | 398/58 |
| 7,424,225 B1 | * | 9/2008 | Elliott | 398/115 |
| 8,244,137 B1 | * | 8/2012 | Chen | 398/130 |
| 8,510,033 B2 | * | 8/2013 | Park et al. | 701/409 |
| 2009/0074412 A1 | * | 3/2009 | Liu et al. | 398/59 |
| 2009/0097848 A1 | * | 4/2009 | Sasak et al. | 398/52 |
| 2009/0179742 A1 | * | 7/2009 | Takeshima et al. | 340/10.1 |
| 2009/0245806 A1 | * | 10/2009 | Murayama et al. | 398/130 |
| 2010/0054748 A1 | * | 3/2010 | Sato | 398/130 |
| 2010/0284690 A1 | * | 11/2010 | Rajagopal et al. | 398/43 |
| 2011/0217044 A1 | * | 9/2011 | Kang et al. | 398/67 |
| 2012/0082469 A1 | * | 4/2012 | Xia et al. | 398/196 |
| 2012/0230698 A1 | * | 9/2012 | Park et al. | 398/118 |
| 2013/0336660 A1 | * | 12/2013 | Chin et al. | 398/118 |

* cited by examiner

*Primary Examiner* — David Payne
*Assistant Examiner* — Pranesh Barua
(74) *Attorney, Agent, or Firm* — Staas & Halsey LLP (57) ABSTRACT

A wireless light communication system and method using a plurality of light transmitting units driven by a same alternating current (AC) power, and a light receiving unit for receiving optical signals transmitted by the plurality of light transmitting units are provided. The wireless light communication method includes setting a channel for each of the plurality of light transmitting units such that light transmitting units having an overlapping area that is reachable by optical signals use different channels, detecting zero crossing of the AC power, synchronizing channels by using the detected zero crossing, and transmitting an optical signal through the set channel by using the plurality of light transmitting units, and receiving the optical signal transmitted by each of the plurality of light transmitting units by using the light receiving unit, and analyzing information included in the received optical signal.

20 Claims, 6 Drawing Sheets

WIRELESS LIGHT COMMUNICATION SYSTEM AND WIRELESS LIGHT COMMUNICATION METHOD USING THE SAME

CROSS-REFERENCE TO RELATED APPLICATIONS

This application is related to and claims priority to Korean Patent Application No. 10-2011-0127221, filed on Nov. 30, 2011, in the Korean Intellectual Property Office, the disclosure of which is incorporated herein.

BACKGROUND

1. Field

The embodiments discussed herein relate to a wireless light communication system and a wireless light communication method.

2. Description of the Related Art

A wireless light communication method for exchanging information by wirelessly transmitting and receiving an optical signal including the information is widely used. An example of the wireless light communication method is an infrared communication method using an infrared light. Due to light emitting diode (LED) lighting being used widely, a wireless light communication method of controlling dimming of the LED lighting is of great interest.

A wireless light communication method may be used in a system for determining location information. For example, when a plurality of LED lighting having fixed locations transmit optical signals including corresponding location information, the system may receive an optical signal to analyze the location information included in the optical signal, thereby determining a location where the optical signal is received. However, in the system using such a wireless light communication method, LED lighting should be provided such that there is no area where an optical signal does not reach, i.e., there is no shadow area, so as to accurately determine location information. If LED lighting is provided such that there is no shadow area, an area where more than one optical signal is transmitted may be generated. In this case, the optical signals may interfere with each other, and thus the system may not receive an accurate optical signal.

SUMMARY

Additional aspects and/or advantages will be set forth in part in the description which follows and, in part, will be apparent from the description, or may be learned by practice of the invention.

An exemplary embodiment of the present invention provides a wireless communication system for preventing interference when at least two optical signals are received, and a wireless communication method using the wireless communication system.

According to an aspect of the present invention, a wireless light communication method is provided using a plurality of light transmitting units driven by a same alternating current (AC) power, and a light receiving unit for receiving optical signals transmitted by the plurality of light transmitting units, the wireless light communication method including setting a channel for each of the plurality of light transmitting units such that light transmitting units having an overlapping area that is reachable by optical signals use different channels, detecting zero crossing of the AC power, synchronizing channels by using the detected zero crossing, and transmitting an optical signal through the set channel by using the plurality of light transmitting units, and receiving the optical signal transmitted by each of the plurality of light transmitting units by using the light receiving unit, and analyzing information included in the received optical signal.

The synchronizing and transmitting may include generating a channel synchronous signal based on the detected zero crossing determining a time slot section for each of channels based on a predetermined number of channels, by using the channel synchronous signal; and transmitting the optical signal during a time slot section corresponding to the set channel.

If more than one optical signal is received by the light receiving unit through different channels, all information included in each of the optical signals may be analyzed.

Each of the plurality of light transmitting units may transmit an optical signal including corresponding location information, and the analyzing of the information may include determining a location corresponding to the location information included in the received optical signal as a location of the light receiving unit.

If more than one optical signal is received by the light receiving unit through different channels, a location corresponding to all of location information of the received optical signals may be determined to be the location of the light receiving unit.

The plurality of light transmitting units may be light emitting diode (LED) lighting, and the optical signal may be generated through dimming control of the plurality of light transmitting units.

According to an aspect of the present invention, a light transmitting unit may be included in a wireless light communication system, the light transmitting unit including a light generator for generating a light, a channel setter for setting a channel different from channels of light transmitting units having an overlapping area that is reachable by optical signals, from among other light transmitting units included in the wireless light communication system, as a channel of the light transmitting unit; a zero crossing detector for detecting zero crossing of alternating current (AC) power supplied to the light transmitting unit; and a controller for synchronizing the channel of the light transmitting unit with the channels of other light transmitting units included in the wireless light communication system, and enabling the light generator to transmit an optical signal through the channel set by the channel setter.

The controller may generate a channel synchronous signal based on the detected zero crossing, determine a time slot section for each of channels based on a predetermined number of channels by using the generated channel synchronous signal, and enable the light generator to transmit an optical signal during a time slot section corresponding to the set channel.

The light generator may be light emitting diode (LED) lighting, and the controller may enable the light generator to transmit an optical signal via dimming control.

According to an aspect of the present invention, a wireless light communication system is provided including a plurality of light transmitting units driven by a same alternating current (AC) power, and a light receiving unit for receiving optical signals transmitted by the plurality of light transmitting units, the wireless light communication system including: a light transmitting unit for detecting zero crossing of the AC power and synchronizing a channel by using the detected zero crossing, and then transmitting an optical signal through a channel different from channels of other light transmitting units, which is included in the wireless light communication system, having an overlapping area that is reachable by optical signals, and a light receiving unit for receiving the optical signal transmitted from the light transmitting unit, and analyzing information included in the received optical signal.

The light transmitting unit may include a light generator for generating a light, a channel setter for setting a channel different from channels of light transmitting units having an overlapping area that is reachable by optical signals, from among other light transmitting units included in the wireless light communication system, as a channel of the light transmitting unit, a zero crossing detector for detecting zero crossing of the AC power, and a controller for synchronizing the channel of the light transmitting unit with the channels of other light transmitting units included in the wireless light communication system, and enabling the light generator to transmit an optical signal through the channel set by the channel setter.

The controller may generate a channel synchronous signal based on the detected zero crossing, determine a time slot section for each of channels based on a predetermined number of channels by using the generated channel synchronous signal, and enable the light generator to transmit an optical signal during a time slot section corresponding to the set channel.

The light generator may be light emitting diode (LED) lighting, and the controller may enable the light generator to transmit an optical signal via dimming control.

The light receiving unit may include a light receiver for receiving the optical signal transmitted by the light transmitting unit, and an information analyzer for analyzing information included in the received optical signal.

If the light receiver receives at least two optical signals through different channels, the information analyzer may analyze all information included in each of the received at least two optical signals.

The plurality of light transmitting units may transmit optical signals including their own location information, and the information analyzer may determine a location corresponding to location information included in an optical signal received by the light receiver as a location of the light receiver.

If the light receiver receives at least two optical signals through different channels, the information analyzer may determine a location corresponding to all of location information of the received at least two optical signals as a location of the light receiving unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Exemplary embodiments are described in greater detail with reference to the accompanying drawings.

Figure 1:
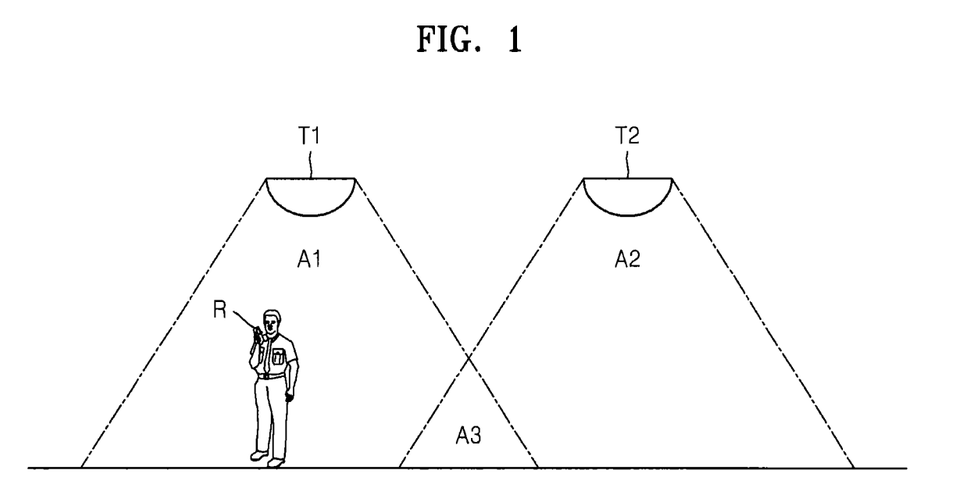
FIG. 1 illustrates a wireless light communication system according to an exemplary embodiment of the present invention.
Figure 2:
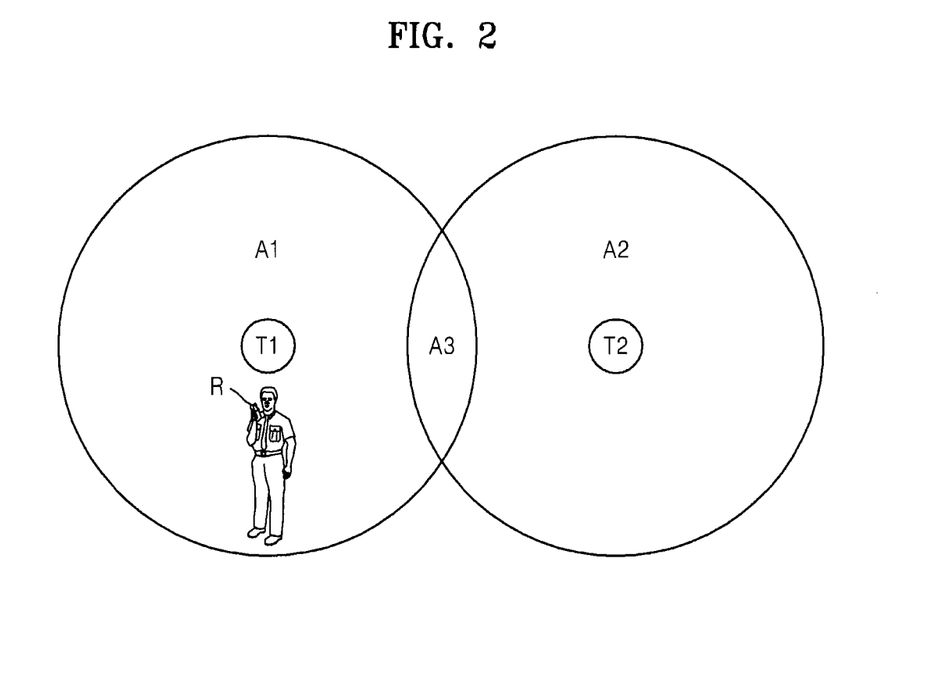
FIG. 2 illustrates an exemplary embodiment of a wireless light communication system.

FIG. 1 illustrates a wireless light communication system according to an exemplary embodiment of the present invention, and FIG. 2 illustrates a wireless light communication system of FIG. 1. The wireless light communication system of FIGS. 1 and 2 may use light emitting diode (LED) lighting as light transmitting units T1 and T2, wherein the light transmitting units T1 and T2 transmit optical signals including their own location information via dimming control. According to an exemplary embodiment, information included in an optical signal may be location information, but alternatively, other types of information may be included in the optical signal. According to an exemplary embodiment, the light transmitting units T1 and T2 may be LED lighting, but alternatively, a light transmitting unit or the like that generates an infrared light may be used. An exemplary method of generating an optical signal including location information via dimming control is described with reference to FIG. 3 illustrating light transmitting units T1 and T2.

A light receiving unit R belonging to a user in FIGS. 1 and 2 may analyze the location information included in the optical signals by receiving the optical signals transmitted from the light transmitting units T1 and T2, and determine a location corresponding to analyzed location information as a current location of the light receiving unit R. Referring to FIGS. 1 and 2, each of the optical signals transmitted by the light transmitting units T1 and T2 may have different reachable areas. For example, the optical signal transmitted from the light transmitting unit T1 reaches areas A1 and A3, and the optical signal transmitted from the light transmitting unit T2 reaches areas A2 and A3. Accordingly, if the light receiving unit R analyzes location information included in a received optical signal and determines that the optical signal is transmitted from the light transmitting unit T1, the area A1 is determined to be the current location of the light receiving unit R. On the other hand, if the light receiving unit R analyzes location information included in a received optical signal and determines that the optical signal is transmitted from the light transmitting unit T2, the area A2 is determined to be the current location of the light receiving unit R. Alternatively, If the light receiving unit R received optical signals from both the light transmitting units T1 and T2, the area A3 is determined to be the current location of the light receiving unit R.

However, if areas that are reached by optical signals transmitted from different light transmitting units overlap with each other, interference may be generated between the optical signals. For example, if the light receiving unit R is located in the area A3 of FIGS. 1 and 2, location information may not be accurately analyzed as the optical signals transmitted from the light transmitting units T1 and T2 may interfere with each other. Optical signals may not interfere with each other if light transmitting units are disposed such that areas that are reached by the optical signals transmitted from the light transmitting units do not overlap. However, to determine an accurate location of the light receiving unit R, an optical signal should reach every area. However, it is difficult to locate the light transmitting units to satisfy such a condition, and difficult to satisfy luminous intensity of lighting, if the light transmitting units also operate as lighting. Accordingly, an exemplary embodiment of the present invention provides a wireless light communication system and a wireless light communication method that are capable of accurately analyzing location information while relatively freely locating light transmitting units by preventing optical signals from interfering with each other. An exemplary wireless light communication system is described in detail with reference to FIG. 3.

Figure 3:
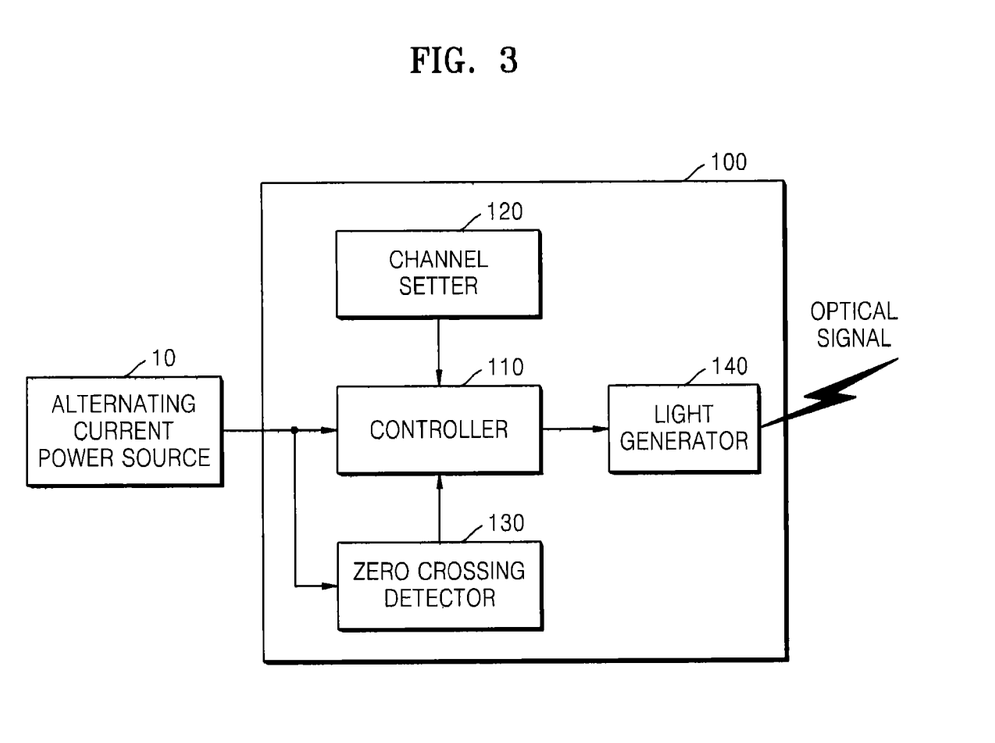
FIG. 3 illustrates an exemplary light transmitting unit included in a wireless light communication system, according to an embodiment of the present invention.

FIG. 3 illustrates a light transmitting unit 100 included in a wireless light communication system, according to an exemplary embodiment of the present invention. Referring to FIG. 3, the light transmitting unit 100 includes a controller 110, a channel setter 120, a zero crossing detector 130, and a light generator 140.

The controller 110 may generate a light in a shape of a pattern indicating location information while controlling brightness of the light by controlling an on/off status of a light generated by the light generator 140 in a predetermined frequency. A controller 110 may control an on/off frequency of a light so as to be high such that a user does not recognize the on/off frequency, so that the light transmitting unit 100 transmits an optical signal while operating, for example, as a general lighting.

The controller 110 may control dimming of the light generator 140 such that the light generator 140 generates a light in a shape of a predetermined pattern. In other words, the light generator 140 generates a light patterned to include location information of the light transmitting unit 100. The controller 110 may perform dimming control at a frequency equal to or above 200 Hz so that blinking of lighting is not apparent to a person. The light generator 140 transmits an optical signal including location information while performing functions of general lighting. In addition, brightness of the lighting may be adjusted while transmitting the optical signal including the location information through the dimming control.

The channel setter 120 may be configured to set a channel to be used by the light transmitting unit 100 to transmit an optical signal. The channel setter 120 may be a switch so that the user directly manipulates the switch to set a channel. Alternatively, if light transmitting units included in the wireless light communication system are connected to each other via a network, the channel setter 120 may automatically set a channel by communicating with other light transmitting units. An exemplary operation of a channel setter 120 is as follows. Referring back to FIGS. 1 and 2, since the areas that are reached by the optical signals transmitted by the light transmitting units T1 and T2 overlap with each other, channels of the light transmitting units T1 and T2 may be differently set so that the optical signals are transmitted through different channels. A channel is not in a frequency domain but in a time domain, and different time slots are assigned to each channel. In other words, the optical signals do not interfere with each other as the light transmitting units T1 and T2 transmit the optical signals at different time slots. As such, the channel setter 120 sets a channel of the light transmitting unit 100 such that the channel is different from a channel of another light transmitting unit having an overlapping area that optical signals reach.

The zero crossing detector 130 detects zero crossing of an alternating current (AC) power supplied to the light transmitting unit 100 for channel synchronization. Since channels of light transmitting units are synchronized by using the zero crossing of the AC power detected by the zero crossing detector 130, the light transmitting units should be driven by the same AC power.

When the channel setter 120 has set a channel to be used and the zero crossing detector 130 has synchronized the channels by using the detected zero crossing of the AC power, the light generator 140 generates a light to transmit an optical signal through the set channel, for example, according to control of the controller 110.

Figure 4:
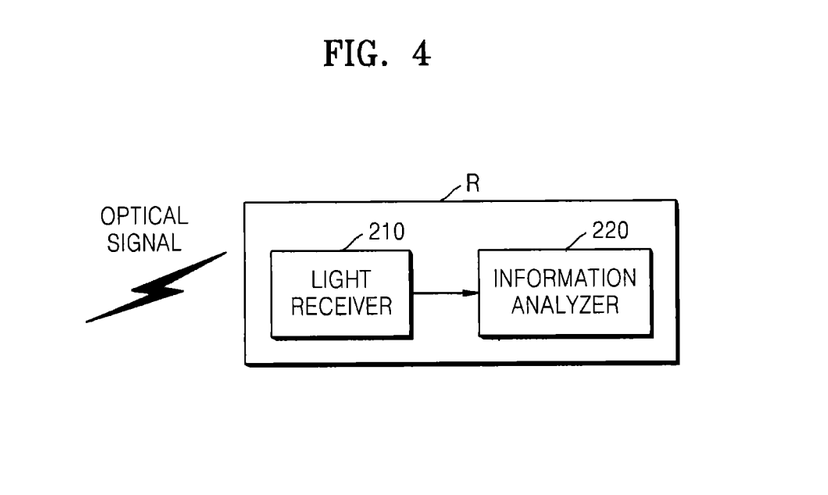
FIG. 4 illustrates an exemplary light receiving unit included in a wireless light communication system, according to an embodiment of the present invention.

FIG. 4 illustrates a light receiving unit R included in a wireless light communication system, according to an exemplary embodiment of the present invention. If the light receiving unit R is in the area A1 as illustrated in FIGS. 1 and/or 2, a light receiver 210 may receive an optical signal transmitted from the light transmitting unit T1. An information analyzer 220 may determine that the optical signal is transmitted from the light transmitting unit T1 by analyzing location information included in the optical signal, and thus determine that a location of the light receiving unit R is in the area A1. If the light receiving unit R is in the area A2, the light receiver 210 receives an optical signal from the light transmitting unit T2 and analyzes location information included in the optical signal, thereby determining that the location of the light receiving unit R is in the area A2. On the other hand, if the light receiving unit R is in the area A3, the light receiver 210 receives both optical signals from the light transmitting units T1 and T2. Since the optical signals from the light transmitting units T1 and T2 are transmitted through different channels, the light receiver 210 receives the optical signals at different times. Accordingly, the optical signals do not interfere with each other, and the information analyzer 220 determines that the light receiving unit R is in the area A3 by analyzing both optical signals received at different times.

Figure 5:
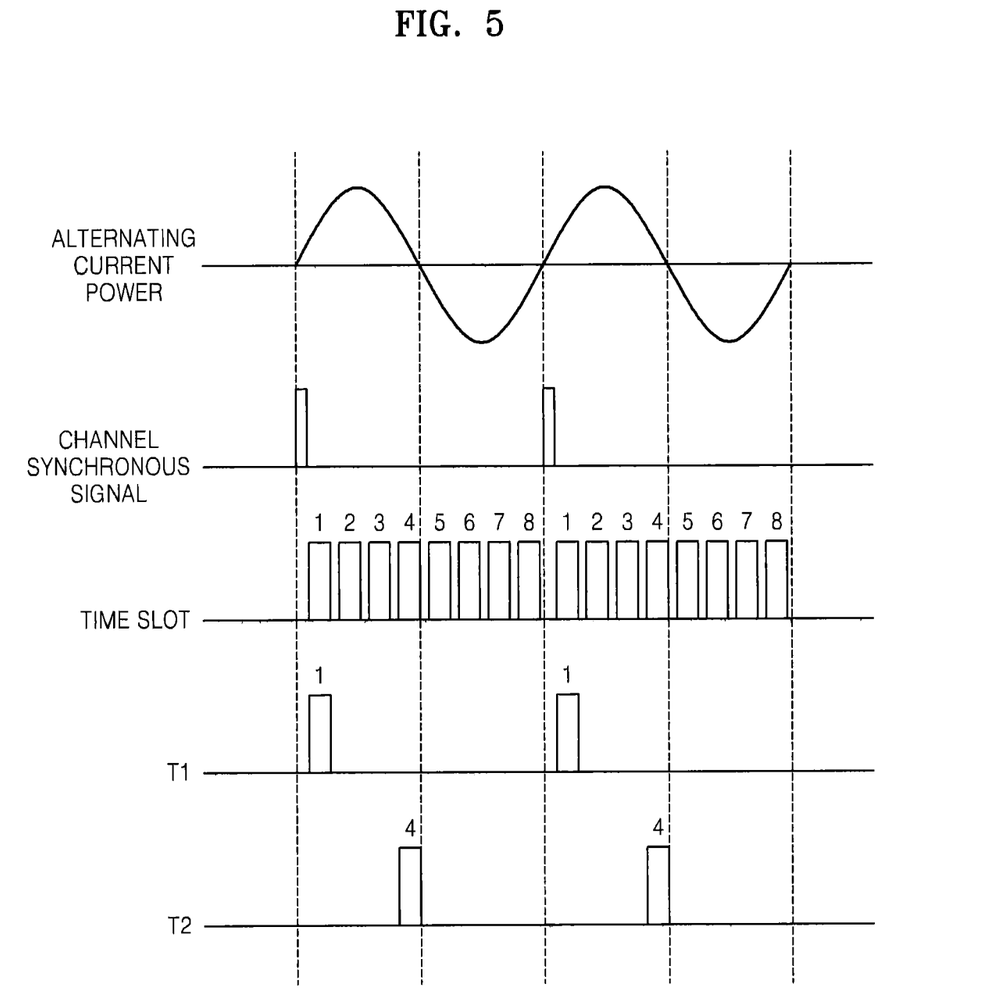
FIG. 5 illustrates exemplary channel synchronization via zero crossing detection and optical signal transmission via a synchronized channel, in a wireless light communication method, according to an embodiment of the present invention.

FIG. 5 illustrates channel synchronization via zero crossing detection and optical signal transmission via a synchronized channel, in a wireless light communication method, according to an embodiment of the present invention. When AC power shown in FIG. 5 is supplied to the light transmitting unit 100, the zero crossing detector 130 detects zero crossing of the AC power. FIG. 5 illustrates an exemplary detection of five zero crossings in a graph of the AC power. If the light transmitting unit 100 additionally includes a phase detector (not shown) or the zero crossing detector 130 detects a phase of the AC power, the detected zero crossings may be classified. For example, the crossings may be classified into two types, i.e., a zero crossing at a point where the AC power changes from negative to positive and a zero crossing at a point where the AC power changes from positive to negative. FIG. 5 illustrates the zero crossing and the phase being detected so that the controller 110 generates a channel synchronous signal at the zero crossing at the point where the AC power changes from negative to positive. The controller 110 may determine a time slot section according to channels based on a total number of channels to be used by using the channel synchronous signal. In FIG. 5, an exemplary total number of channels is illustrated as 8, and a section between two adjacent channel synchronous signals, i.e., a period of the AC power, is divided into an exemplary value of 8 to determine the time slot sections. In FIG. 5, a number above each time slot section denotes an identification number of a corresponding channel. The exemplary channels 1 through 8 are assigned to the time slot sections respectively in order. On the other hand, channel synchronous signals may be generated for all zero crossings, and in this case, time slot sections according to channels may be determined by dividing a half period of the AC power by a total number of channels to be used.

The two bottom graphs in FIG. 5 illustrate optical signals transmitted by the light transmitting units T1 and T2, for example of FIGS. 1 and 2, through corresponding channels.

The channel setter 120 sets the light transmitting units T1 and T2, which have an overlapping area where optical signals reach, to use different channels. In FIG. 5, channel 1 is set for the light transmitting unit T1 and channel 4 is set for the light transmitting unit T2. The setting of channels may be performed as the user directly manipulates the channel setter 120 in a form of a switch, or automatically performed as the light transmitting units T1 and T2 recognize each other having the overlapping area through communication, and use different channels.

Upon the time slot section according to channels being determined and the channels to be used by the optical transmitting units T1 and T2 being set, the channels may be synchronized by using the channel synchronous signal and then the light transmitting units T1 and T2 may transmit the optical signals through the set channels, thereby preventing the optical signals from interfering with each other at the overlapping area. By synchronizing the channels by detecting the zero crossings of the AC power commonly applied to the light transmitting units T1 and T2, the channel synchronization may be performed without having to use a separate structure and device for channel synchronization.

Figure 6:
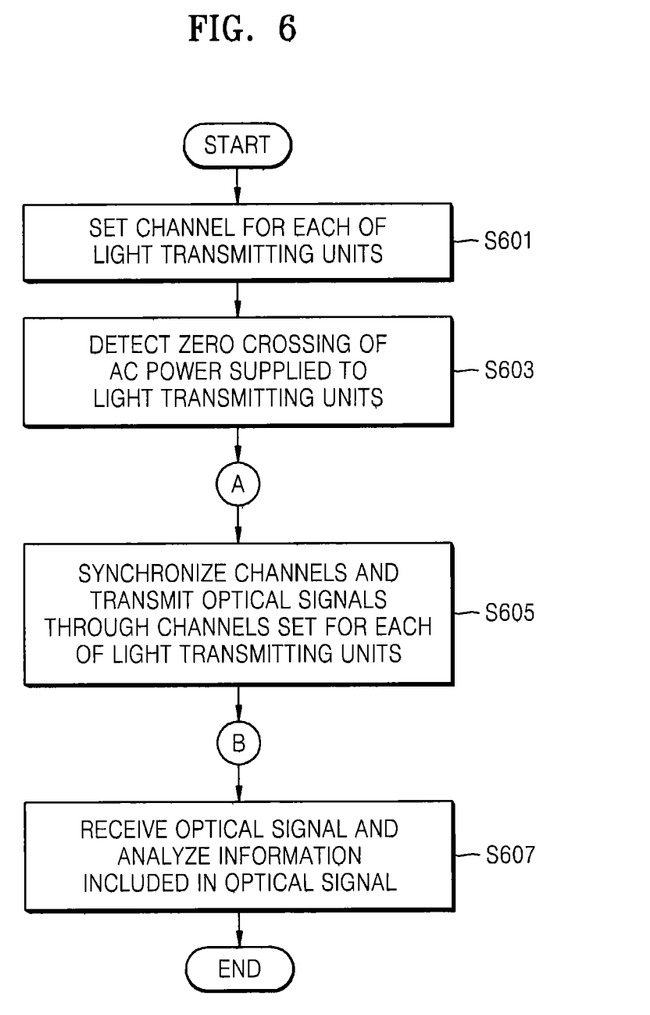
FIGS. 6 through 8 illustrate a wireless light communication method according to an embodiment of the present invention.
Figure 7:
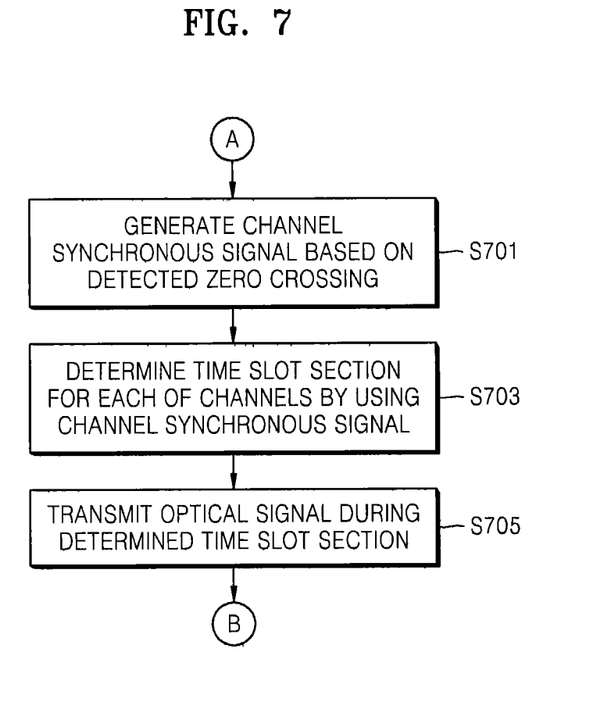
Figure 8:
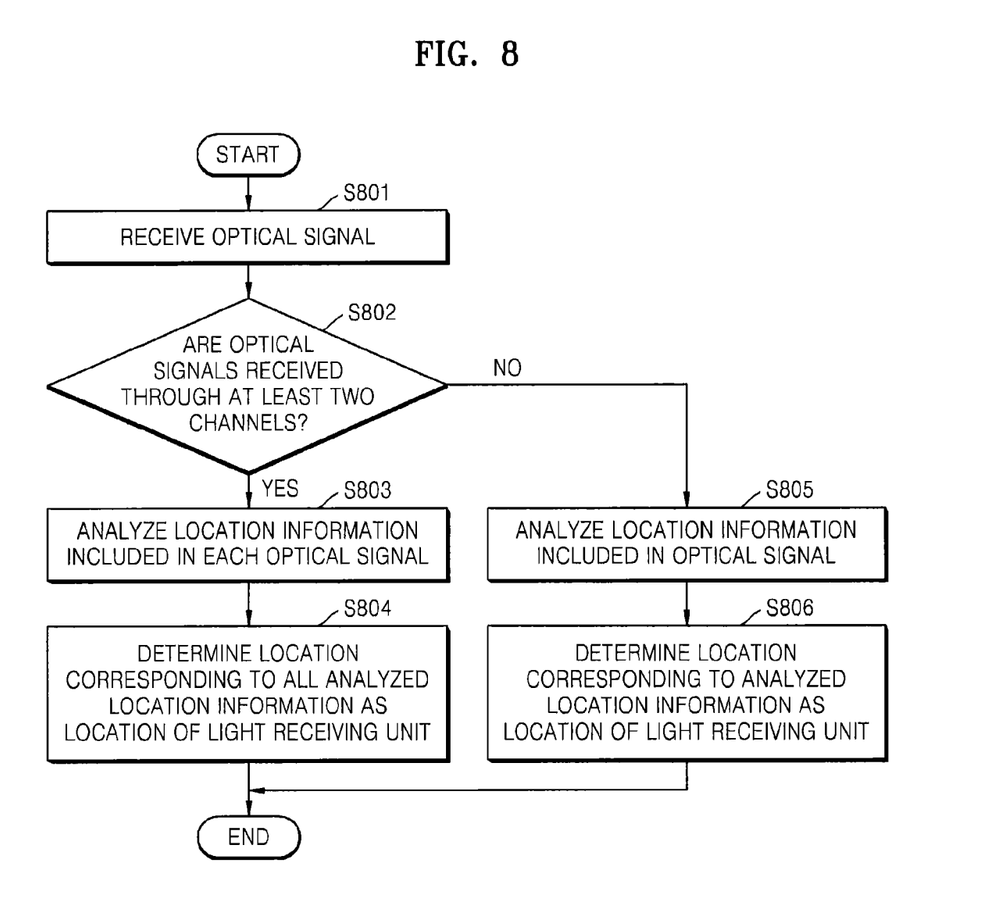

FIGS. 6 through 8 illustrate a wireless light communication method according to an exemplary embodiment of the present invention.

Referring to FIG. 6, a channel to be used to transmit an optical signal may be set for each of light transmitting units in operation S601. The channel may be differently set from a channel of another light transmitting unit having an overlapping area that optical signals reach. The channel may be directly set by a user or automatically set. When the channel is set for each of the light transmitting units in operation S601, zero crossing of AC power commonly supplied to the light transmitting units is detected in operation S603. A channel synchronous signal may be generated by using the zero crossing, and a time slot section according to channels may be determined according to a total number of channels to be used. In operation S605, the channels are synchronized by using the channel synchronous signal and an optical signal is transmitted through the channel set for each of the light transmitting units. Information included in the optical signal is analyzed upon receiving the optical signal, in operation S607. Since the light transmitting units use different channels and the channels are synchronized by the channel synchronous signal, the optical signals transmitted from the light transmitting units are transmitted and received at different times, and thus do not interfere with each other.

FIG. 7 illustrates operation S605 of FIG. 6. Referring to FIG. 7, when the channel synchronous signal is generated based on the detected zero crossing in operation S701, a time slot section for each of channels may be determined based on a total number of channels to be used by using the channel synchronous signal in operation S703, and an optical signal is transmitted during a time slot section corresponding to the channel set for each light transmitting unit from among the determined time slot sections in operation S705.

FIG. 8 illustrates processes of analyzing location information included in an optical signal and determining a location of a light receiving unit. When an optical signal is received in operation S801, it may be determined whether at least two optical signals are received in operation S802. If it is determined that at least two optical signals are received, location information included in the at least two optical signals is analyzed in operation S803. A location corresponding to all of the analyzed location information is determined to be a location of the light receiving unit in operation S804. As illustrated, for example, in FIG. 1, if the light receiving unit R receives both optical signals transmitted from the light transmitting units T1 and T2 in the area A3, locations corresponding to the location information included in the optical signal of the light transmitting unit T1 are the areas A1 and A3, and locations corresponding to the location information included in the optical signal of the light transmitting unit T2 are the areas A2 and A3, and thus the location corresponding to all of the location information is the area A3. Since the at least two optical signals are received at different times through different channels, they do not interfere with each other, and thus the location information included in each optical signal is accurately analyzed in operation S803.

Upon it being determined that only one optical signal is received in operation S802, location information included in the optical signal may be analyzed in operation S805, and a location corresponding to the analyzed location information is determined to be the location of the light receiving unit in operation S806.

According to an exemplary embodiment of the present invention, since light transmitting units having an overlapping area where optical signals reach from among light transmitting units included in a wireless light communication system use different channels and channels are synchronized by detecting zero crossing of AC power supplied to the light transmitting units, the optical signals do not interfere with each other even if two or more optical signals are received, and thus accurate and stable communication is possible.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A wireless light communication method using a plurality of light transmitting units driven by a same alternating current (AC) power, and a light receiving unit for receiving optical signals transmitted by the plurality of light transmitting units, the wireless light communication method comprising:
   determining a plurality of light transmitting units have optical signals with an overlapping area;
   setting a channel for each of the plurality of light transmitting units such that light transmitting units having the overlapping area that is reachable by the optical signals use different channels;
   detecting zero crossing of the AC power;
   synchronizing channels by using the detected zero crossing, and transmitting an optical signal through the set channel by using the plurality of light transmitting units; and
   receiving the optical signal transmitted by each of the plurality of light transmitting units by using the light receiving unit, and analyzing information included in the received optical signal,
   wherein the channel is in a time domain, and different time slots are assigned to each channel.

2. The wireless light communication method of claim 1, wherein the synchronizing and transmitting comprises:
   generating a channel synchronous signal based on the detected zero crossing;
   determining a time slot section for each of channels based on a predetermined number of channels, by using the channel synchronous signal; and
   transmitting the optical signal during a time slot section corresponding to the set channel.

3. The wireless light communication method of claim 1, wherein, if at least two optical signals are received by the light receiving unit through different channels, all information included in each of the at least two optical signals is analyzed.

4. The wireless light communication method of claim 1, wherein each of the plurality of light transmitting units transmits an optical signal including corresponding location information, and
the analyzing of the information comprises determining a location corresponding to the location information included in the received optical signal as a location of the light receiving unit.

5. The wireless light communication method of claim 4, wherein, if at least two optical signals are received by the light receiving unit through different channels, a location corresponding to all of location information of the received at least two optical signals is determined to be the location of the light receiving unit.

6. The wireless light communication method of claim 1, wherein the plurality of light transmitting units are light emitting diode (LED) lighting, and the optical signal is generated through dimming control of the plurality of light transmitting units.

7. A non-transitory computer-readable recording medium having recorded thereon a program for executing the method of claim 1.

8. A light transmitting unit included in a wireless light communication system, the light transmitting unit comprising:
a light generator for generating a light;
a channel setter for determining a plurality of light transmitting units have optical signals with an overlapping area and setting a channel different from channels of the light transmitting units having the overlapping area that is reachable by optical signals, from among other light transmitting units included in the wireless light communication system, as a channel of the light transmitting unit;
a zero crossing detector for detecting zero crossing of alternating current (AC) power supplied to the light transmitting unit; and
a controller for synchronizing the channel of the light transmitting unit with the channels of other light transmitting units included in the wireless light communication system, and enabling the light generator to transmit an optical signal through the channel set by the channel setter,
wherein the channel is in a time domain, and different time slots are assigned to each channel.

9. The light transmitting unit of claim 8, wherein the controller generates a channel synchronous signal based on the detected zero crossing, determines a time slot section for each of channels based on a predetermined number of channels by using the generated channel synchronous signal, and enables the light generator to transmit an optical signal during a time slot section corresponding to the set channel.

10. The light transmitting unit of claim 8, wherein the light generator is light emitting diode (LED) lighting, and the controller enables the light generator to transmit an optical signal via dimming control.

11. A wireless light communication system comprising a plurality of light transmitting units driven by a same alternating current (AC) power, and a light receiving unit for receiving optical signals transmitted by the plurality of light transmitting units, the wireless light communication system comprising:
a light transmitting unit for determining a plurality of light transmitting units have optical signals with an overlapping area and detecting zero crossing of the AC power and synchronizing a channel by using the detected zero crossing, and then transmitting an optical signal through a channel different from channels of other light transmitting units, which is included in the wireless light communication system, having the overlapping area that is reachable by optical signals; and
a light receiving unit for receiving the optical signal transmitted from the light transmitting unit, and analyzing information included in the received optical signal,
wherein the channel is in a time domain, and different time slots are assigned to each channel.

12. The wireless light communication system of claim 11, wherein the light transmitting unit comprises:
a light generator for generating a light;
a channel setter for setting a channel different from channels of light transmitting units having the overlapping area that is reachable by optical signals, from among other light transmitting units included in the wireless light communication system, as a channel of the light transmitting unit;
a zero crossing detector for detecting zero crossing of the AC power; and
a controller for synchronizing the channel of the light transmitting unit with the channels of other light transmitting units included in the wireless light communication system, and enabling the light generator to transmit an optical signal through the channel set by the channel setter.

13. The wireless light communication system of claim 12, wherein the controller generates a channel synchronous signal based on the detected zero crossing, determines a time slot section for each of channels based on a predetermined number of channels by using the generated channel synchronous signal, and enables the light generator to transmit an optical signal during a time slot section corresponding to the set channel.

14. The wireless light communication system of claim 12, wherein the light generator is light emitting diode (LED) lighting, and the controller enables the light generator to transmit an optical signal via dimming control.

15. The wireless light communication system of claim 11, wherein the light receiving unit comprises:
a light receiver for receiving the optical signal transmitted by the light transmitting unit; and
an information analyzer for analyzing information included in the received optical signal.

16. The wireless light communication system of claim 15, wherein, if the light receiver receives at least two optical signals through different channels, the information analyzer analyzes all information included in each of the received at least two optical signals.

17. The wireless light communication system of claim 15, wherein the plurality of light transmitting units transmit optical signals including their own location information, and the information analyzer determines a location corresponding to location information included in an optical signal received by the light receiver as a location of the light receiver.

18. The wireless light communication system of claim 17, wherein, if the light receiver receives at least two optical signals through different channels, the information analyzer determines a location corresponding to all of location information of the received at least two optical signals as a location of the light receiving unit.

19. A communication method using a plurality of transmitters driven by a same alternating current (AC) power, the communication method comprising:

determining a plurality of transmitters having signals with an overlapping area;

setting a channel for each of the plurality of transmitters such that those of the plurality of transmitters having the overlapping area that is reachable by signals use different channels;

detecting zero crossing of the AC power; and synchronizing channels by using the detected zero crossing, and transmitting a signal through the set channel by using the plurality of transmitters, wherein the channel is in a time domain, and different time slots are assigned to each channel.

20. A transmitter in a system including a plurality of transmitters, the transmitter comprising:

a signal generator for generating a signal;

a channel setter for determining as least one of a plurality of other transmitters having a second signal with an overlapping area of the first signal and setting a channel different from channels of other of the plurality of transmitters having the overlapping area that is reachable by the generated signal and signals from the other of the plurality of transmitters;

a zero crossing detector for detecting a zero crossing of alternating current power supplied to the transmitter; and a controller for synchronizing the channel of the transmitter with the channels of the other of the plurality of transmitters, and enabling the generator to transmit a signal through the channel set by the channel setter, wherein the channel is in a time domain, and different time slots are assigned to each channel.

* * * * *

UNITED STATES PATENT AND TRADEMARK OFFICE
CERTIFICATE OF CORRECTION

| | | |
|---|---|---|
| PATENT NO. | : 9,054,799 B2 | Page 1 of 1 |
| APPLICATION NO. | : 13/614155 | |
| DATED | : June 9, 2015 | |
| INVENTOR(S) | : Seong-man Park et al. | |

It is certified that error appears in the above-identified patent and that said Letters Patent is hereby corrected as shown below:

In the claims

Claim 20, Column 11, Line 16

Delete "as least" and insert --at least--, therefor.

Signed and Sealed this
Twenty-seventh Day of October, 2015

Michelle K. Lee
*Director of the United States Patent and Trademark Office*